(12) United States Patent
Barad et al.

(10) Patent No.: US 12,196,633 B2
(45) Date of Patent: Jan. 14, 2025

(54) SENSOR ASSEMBLY

(71) Applicant: AIRBUS OPERATIONS LIMITED, Bristol (GB)

(72) Inventors: Kayvon Barad, Bristol (GB); Christopher Wood, Bristol (GB); Andrew Ramshaw, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 244 days.

(21) Appl. No.: 17/915,978

(22) PCT Filed: Mar. 30, 2021

(86) PCT No.: PCT/EP2021/058370
§ 371 (c)(1),
(2) Date: Sep. 29, 2022

(87) PCT Pub. No.: WO2021/198301
PCT Pub. Date: Oct. 7, 2021

(65) Prior Publication Data
US 2023/0145838 A1 May 11, 2023

(30) Foreign Application Priority Data

Mar. 30, 2020 (GB) .................................. 2004647

(51) Int. Cl.
*G01L 1/24* (2006.01)
*G01K 11/3206* (2021.01)
(Continued)

(52) U.S. Cl.
CPC .......... *G01L 1/246* (2013.01); *G01K 11/3206* (2013.01); *G01L 5/0019* (2013.01); *G01K 13/08* (2013.01)

(58) Field of Classification Search
None
See application file for complete search history.

(56) References Cited

U.S. PATENT DOCUMENTS 5,677,488 A * 10/1997 Monahan ............... F16C 19/30
73/660
8,195,015 B2  6/2012 Becker et al.
(Continued)

FOREIGN PATENT DOCUMENTS

CN    103344432    10/2013
CN    103411550    11/2013
(Continued)

OTHER PUBLICATIONS

International Search Report for PCT/EP2021/058370 dated Oct. 22, 2021, 6 pages.
(Continued)

*Primary Examiner* — Jerry Rahll
(74) *Attorney, Agent, or Firm* — Nixon & Vanderhye P.C.

(57) ABSTRACT

An assembly having a bearing with an axis of rotation, and a fibre-based sensor for sensing strain or temperature of the bearing is disclosed. The sensor extends in a direction parallel to the axis of rotation. An aircraft system is disclosed including a wheel supported on an axle by a first bearing and a second bearing. The system further includes a first fibre optic sensor for sensing a strain or temperature of the first bearing, a second fibre optic sensor for sensing a strain or temperature of the second bearing, and an interrogator to analyse optical signals from the sensors to determine differences in the strains or temperatures of the first bearing and the second bearing.

13 Claims, 5 Drawing Sheets

(51) Int. Cl.
*G01L 5/00* (2006.01)
*G01K 13/08* (2006.01)

(56) References Cited

U.S. PATENT DOCUMENTS

| | | | |
|---|---|---|---|
| 8,235,326 B2 | 8/2012 | Briancourt et al. | |
| 9,103,733 B2 | 8/2015 | Reedman | |
| 9,851,278 B2 | 12/2017 | Van Der Ham et al. | |
| 10,113,585 B2 | 10/2018 | Van Genuchten et al. | |
| 10,712,196 B2 | 7/2020 | Oren et al. | |
| 2006/0107765 A1* | 5/2006 | Sentoku | G01L 5/0019 73/862.322 |
| 2009/0026313 A1* | 1/2009 | Briancourt | B64C 25/00 385/12 |
| 2009/0324148 A1* | 12/2009 | Ruggiero | G01D 5/35316 384/103 |
| 2010/0158434 A1* | 6/2010 | Becker | G02B 6/4204 385/13 |
| 2010/0318304 A1* | 12/2010 | Ozaki | G01P 3/443 702/42 |
| 2013/0004117 A1 | 1/2013 | Reedman | |
| 2014/0157874 A1* | 6/2014 | Strandell | G01N 15/0826 73/38 |
| 2014/0159550 A1 | 6/2014 | O'Bryan et al. | |
| 2017/0199101 A1* | 7/2017 | Franchitti | B61L 15/0027 |
| 2017/0227057 A1* | 8/2017 | Hamrodi | B60G 17/019 |
| 2017/0336268 A1* | 11/2017 | Wilson | G01K 11/32 |
| 2019/0277708 A1* | 9/2019 | Miller | G01K 15/005 |
| 2023/0145838 A1* | 5/2023 | Barad | G01L 1/243 385/12 |

FOREIGN PATENT DOCUMENTS

| | | |
|---|---|---|
| CN | 203365029 | 12/2013 |
| CN | 106153224 | 11/2016 |
| CN | 110261017 | 9/2019 |
| DE | 10 2008 061 553 | 6/2010 |
| DE | 10 2009 039 259 | 3/2011 |
| EP | 2 335 015 | 6/2011 |
| EP | 3 246 680 | 11/2017 |
| EP | 3 537 110 | 9/2019 |
| WO | 00/57540 | 9/2000 |
| WO | 2009/073913 | 6/2009 |
| WO | 2010/043699 | 4/2010 |
| WO | 2011/023377 | 3/2011 |
| WO | 2018/130217 | 7/2018 |

OTHER PUBLICATIONS

Written Opinion of the ISA for PCT/EP2021/058370 dated Oct. 22, 2021, 18 pages.

* cited by examiner

SENSOR ASSEMBLY

CROSS-REFERENCE TO RELATED APPLICATIONS

The present application is a National Phase of International Application Number PCT/EP2021/058370 filed Mar. 30, 2021, which designated the U.S. and claims priority benefits from Great Britain Patent Application Number GB 2004647.0, filed Mar. 30, 2020, the entire contents of each of which are hereby incorporated by reference.

TECHNICAL FIELD

The present invention relates to sensor assemblies used with a bearing, and to vehicles, such as aircraft, comprising the same.

BACKGROUND

An aircraft may comprise strain gauge sensors for sensing deflections in the axle of the landing gear. Such sensors are often susceptible to electromagnetic interference and/or are ill-suited to the harsh conditions typical of a landing gear. Additionally, strain gauge sensors may drift over time and may require calibration.

SUMMARY

A first aspect of the present invention provides an assembly comprising a bearing having an axis of rotation, and a fibre-based sensor for sensing strain or temperature of the bearing, wherein the sensor extends in a direction parallel to the axis of rotation.

Optionally, the assembly comprises a further fibre-based sensor that extends in a direction parallel to the axis of rotation or in a direction about the axis of rotation.

Optionally, the further fibre-based sensor extends in a direction parallel to the axis of rotation, and the fibre-based sensor, the further fibre-based sensor and the axis of rotation lie in a common plane.

Optionally, the axis of rotation extends horizontally and the common plane extends horizontally or vertically.

Optionally, the fibre-based sensor is one of a first pair of fibre-based sensors, the assembly comprises a second pair of fibre-based sensors, each of the fibre-based sensors extends in a direction parallel to the axis of rotation, the first pair of sensors lie in a first plane, the second pair of sensors lie in second plane, and the second plane is orthogonal to the first plane.

Optionally, the axis of rotation extends horizontally, the first plane extends horizontally, and the second plane extends vertically.

Optionally, the assembly comprises an axle to which the bearing is secured, and the fibre-based sensor extends within or along an inside of the axle.

Optionally, the assembly comprises a further bearing having the same axis of rotation as the bearing, and the fibre-based sensor senses strain or temperature of the further bearing.

Optionally, the assembly comprises a first further fibre-based sensor and a second further fibre-based sensor, each of the further fibre-based sensors extends in a direction about the axis of rotation, the first further fibre-based senses strain or temperature of the bearing, and the second further fibre-based sensor senses strain or temperature of the further bearing.

Optionally, the assembly comprises a wheel mounted to the bearing.

Optionally, the assembly comprises an interrogator configured to receive output light from the fibre-based sensor, and determine a strain or temperature of the bearing based on the received output light.

A second aspect of the present invention provides a wheel assembly comprising an axle, a bearing mounted to the axle, a wheel mounted to the bearing, and a sensor for sensing a property of the bearing, wherein the sensor comprises an optical fibre that extends along the axle.

Optionally, the wheel assembly comprises a further bearing mounted to the axle, the wheel is mounted to the further bearing, and the sensor senses a property of the further bearing.

Optionally, the wheel assembly comprises a first further sensor and a second further sensor, each of the further sensors comprises an optical fibre that extends about the axle, the first further sensor is located at the bearing, and the second further sensor is located at the further bearing.

A third aspect of the present invention provides a system comprising an interrogator and the wheel assembly according to the second aspect, wherein the interrogator receives light from the sensor to determine strain of the bearing, and the system uses the strain to determine at least one of: a weight on the wheel, a braking force on the wheel, shimmy of the wheel, weight imbalance of the wheel, and peak load of the wheel.

A fourth aspect of the present invention provides an aircraft comprising the assembly according to the first aspect, the wheel assembly according to the second aspect or the system according to the third aspect.

Optionally, the system uses the strain to determine a hard landing, brake condition, bearing condition or wheel condition.

A fifth aspect of the present invention provides an aircraft system comprising: a wheel supported on an axle by a first bearing and a second bearing; a first fibre optic sensor provided at the first bearing for sensing a strain or temperature of the first bearing; a second fibre optic sensor provided at the second bearing for sensing a strain or temperature of the second bearing; and an interrogator configured to receive optical signals from the sensors, and analyse the optical signals to determine differences in the strains or temperatures of the first bearing and the second bearing.

Optionally, each of the sensors is provided around a race of a respective bearing.

Optionally, the first sensor and the second sensor each extend about a rotational axis of the wheel, and the aircraft system comprises a third fibre optic sensor that extends in a direction parallel to the rotational axis.

Optionally, the aircraft system comprises a fourth fibre optic sensor that extends in a direction parallel to the rotational axis, and the third sensor, the fourth sensor and the rotational axis lie in a common plane.

Optionally when the rotational axis extends horizontally, the common plane extends horizontally or vertically.

Optionally, the first sensor extends around the first bearing, the second sensor extends around the second bearing, and the aircraft system comprises a third fibre optic sensor that extends through the first bearing and the second bearing.

Optionally, the third sensor extends along an inside of the axle.

Optionally, each of the sensors is a fibre Bragg grating sensor.

Optionally, the aircraft system uses the differences in the strains or temperatures to determine at least one of: a condition of the bearings, mass imbalance of the wheel, shear forces acting on the wheel, and lateral forces acting on the wheel.

A sixth aspect of the present invention provides an aircraft wheel assembly comprising a wheel supported on an axle by a first bearing and a second bearing, a first fibre optic sensor extending around the first bearing for sensing a strain or temperature of the first bearing, and a second fibre optic sensor extending around the second bearing for sensing a strain or temperature of the second bearing.

Optionally, the aircraft wheel assembly comprises one or more third fibre optic sensors that extend through the first bearing and the second bearing.

A seventh aspect of the present invention provides an aircraft comprising the system according the fifth aspect of the present invention or the assembly according the sixth aspect of the present invention.

An eight aspect of the present invention provides a sensor arrangement for an aircraft comprising a wheel supported by a first bearing and a second bearing, the sensor arrangement comprising: a first fibre Bragg grating sensor for sensing a strain or temperature of the first bearing; a second fibre Bragg grating sensor for sensing a strain or temperature of the second bearing; and an interrogator for receiving optical signals from the sensors, and for analysing the optical signals to determine differences in the strains or temperatures of the first bearing and the second bearing.

BRIEF DESCRIPTION OF THE DRAWINGS

Embodiments of the invention will now be described, by way of example only, with reference to the accompanying drawings, in which.

DETAILED DESCRIPTION

Figure 1:
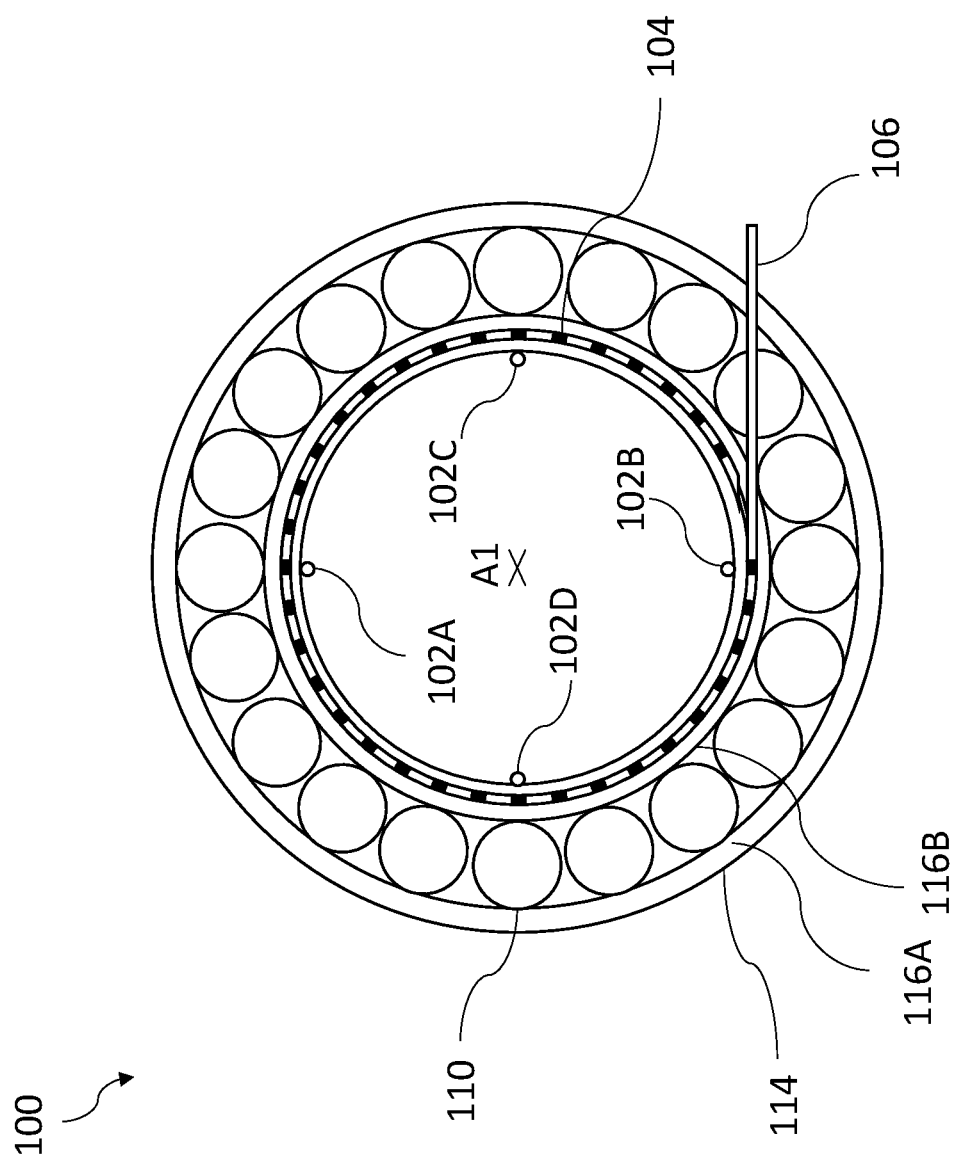
FIG. 1 shows a schematic view of an example of an assembly of an embodiment of the invention.

Referring to FIG. 1, there is shown a schematic view of an assembly 100, according to an example. The assembly 100 comprises a bearing 114 having an axis of rotation A1. The bearing 114 comprises an outer race 116A, an inner race 116B and a plurality of bearing rollers 110 between the outer race 116A and the inner race 116B.

In this example, the assembly 100 comprises five fibre Bragg grating (FBG) sensors 102A, 102B, 102C, 102D, 106 for sensing strain or temperature of the bearing 114. Four of the FBG sensors 102A, 102B, 102C, 102D extend in directions parallel to the axis of rotation A1. The FBG sensor 102A, the FBG sensor 102B and the axis of rotation A1 lie in a common plane. In this particular example, in which the axis of rotation A1 extends horizontally, the common plane extends vertically. The FBG sensor 102C, the FBG sensor 102D and the axis of rotation A1 lie in a further common plane, which in this example extends horizontally. The further common plane is therefore orthogonal to the common plane.

The fifth FBG sensor 106 extends about the axis of rotation A1. The FBG sensor 106 may be arranged to form one or more loops around the bearing 114. In this particular example, the FBG sensor 106 is mounted around the inner race 116B of the bearing 114. In another example, the FBG sensor 106 may be mounted around the outer race 116A of the bearing 114.

Each FBG sensor 102A, 102B, 102C, 102D, 106 is a fibre optic sensor which comprises a plurality of FBG elements 104. The FBG elements 104 are etched directly into the core of an optical fibre. The spacing, between each immediately-adjacent pair of the FBG elements 104, may be equal. Alternatively, the spacing between a first immediately-adjacent pair of the FBG elements 104 may differ from the spacing between a second immediately-adjacent pair of the FBG elements 104. In other embodiments, there may be unequal spacing between each of the FBG elements 104 along the fibre.

Each FBG element 104 is a distributed Bragg reflector comprised within an optical fibre and comprising periodic variations in the refractive index of the core of the fibre along a section of the length of the optical fibre. The wavelength of a band of light reflected from an FBG element 104 is dependent on the axial strain of the fibre within which the FBG is located and/or the temperature to which the FBG element 104 is subjected. FBG sensors are lightweight and the spacing between FBG elements may be below 1 mm. The FBG elements 104 may form a continuous grating. As a result, a large number of sensing points can be located in a small area. An optical fibre may comprise a large number of FBG elements, for example, over 1000 FBG elements. Alternatively, an optical fibre may comprise a small number of FBG elements, for example, 10 FBG elements.

In this example, each FBG element 104 is configured to sense strain or temperature of the bearing 114. In particular, each FBG element 104 is configured so that an optical characteristic of the each FBG element 110 changes in response to changes in strain and/or temperature of the bearing 114. When a mechanical force acts upon the bearing 114, the mechanical force may cause the FBG elements 104 of an FBG sensor to experience a strain. Moreover, different FBG elements 104 may experience different strain. Additionally, the FBG elements 104 of different FBG sensors 102A, 102B, 102C, 102D, 106 may experience different strain according to the location and direction of the mechanical force. When the temperature of the bearing 114 changes, the temperature of an FBG sensor may also change. As a result, the refractive indices of the FBG elements 104 may change. In some cases, changes in the temperature of the bearing and FBG sensor may additionally or alternatively change the thermal expansion of the FBG elements 104. The FBG sensors 102A, 102B, 102C, 102D, 106 are used to measure resultant temperatures or strains at the respective sensor locations, and the optical signals output from the FBG sensors 102A, 102B, 102C, 102D, FBG sensor 106 are received at an interrogator (not shown in FIG. 1). The interrogator uses the received optical signals to determine the strain and/or temperature of the bearing 114.

The FBG elements 104 of one or more of the FBG sensors 102A, 102B, 102C, 102D, 106 may be configured such that a first FBG element reflects a first range of wavelengths of light that is different from a second range of wavelengths of light that is reflected by a second FBG element. Accordingly, when the sensor is used with a suitable interrogator as discussed below, the interrogator is better able to distinguish light received from one of the FBG elements 104 from light received from another of the FBG elements 104, which simplifies determination of the location of the point of application of, for example, a mechanical force on one or more of the FBG elements 104. Additionally or alternatively, the time-of-flight of light received from the FBG elements 104 may be used to distinguish light received from one of the FBG elements 104 from light received from another of the FBG elements 104.

Figure 2:
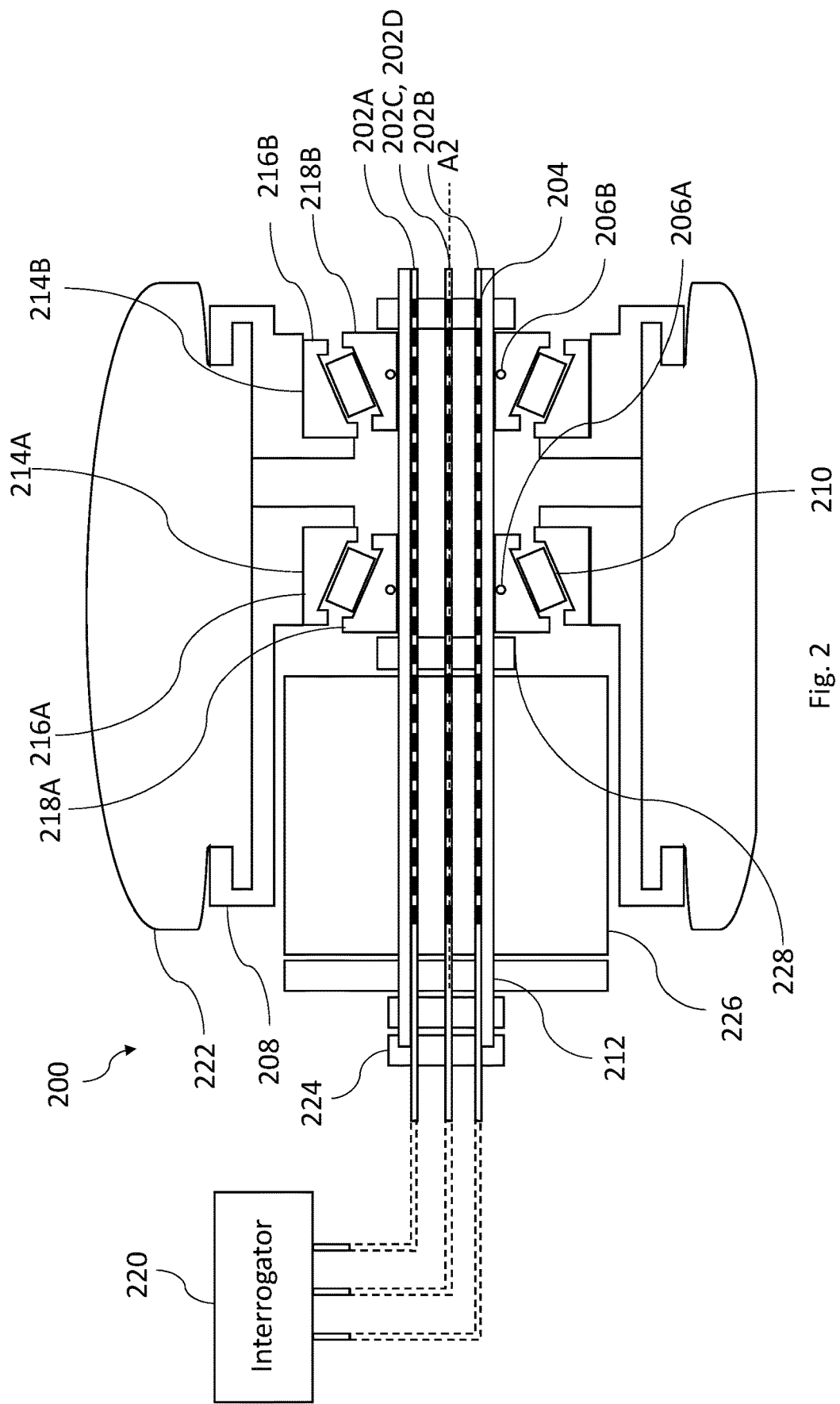
FIG. 2 shows a schematic view of an example of an assembly of an embodiment of the invention.

FIG. 2 shows an aircraft wheel assembly 200. The assembly 200 comprises a wheel 208 supported on an axle 212 by a first bearing 214A and a second bearing 214B. The assembly 200 further comprises a tyre 222 supported on the wheel 208. Each of the bearings 214A, 214B is the same as that described above and comprises an outer race 216A, 216B, an inner race 218A, 218B and a plurality of bearing rollers 210 between the outer race 216A, 216B and the inner race 218A, 218B.

The wheel 208 and bearings 214A, 214B rotate about an axis of rotation A2. The wheel 208 comprises two halves, an inner half wheel and an outer half wheel. The first bearing 214A is mounted to the inner half wheel and the second bearing 214B is mounted to the outer half wheel.

The assembly 200 comprises a brake pack 226 which is secured to the axle 212, the brake pack 226 being located between an outer fastener 224 and a spacer 228, the spacer 228 being located between the brake pack 226 and the inner half wheel of the wheel 208.

In this example, the assembly 200 comprises six FBG sensors for sensing strain or temperature of the bearings 214A, 214B. More particularly, the assembly 200 comprises four axial FBG sensors 202A, 202B, 202C, 202D, and two radial FBG sensors 206A, 206B. Although the assembly comprise four axial FBG sensors, two of the sensors 202C, 202D lie in the same horizonal plane. As a result, one of the sensors 202D lies behind the other of the sensors 202C in FIG. 2.

Each of the axial FBG sensors 202A, 202B, 202C, 202D extends in a direction parallel to the axis of rotation A2. The FBG sensor 202A, the FBG sensor 202B and the axis of rotation A2 lie in a common plane. In the example of FIG. 2, the axis of rotation A2 extends horizontally and the common plane extends vertically. The FBG sensor 202C, the FBG sensor 202D and the axis of rotation A2 lie in a further common plane. In the example shown in FIG. 2, again with the axis of rotation A2 extending horizontally, the further common plane extends horizontally. The further common plane is therefore orthogonal to the common plane. Each FBG sensor 202A, 202B, 202C, 202D extends along an inside of the axle 212. In other examples, the FBG sensors 202A, 202B, 202C, 202D may be embedded within the axle Each of the radial FBG sensors 206A, 206B extends in a direction about the axis of rotation A2. The first circumferential FBG sensor 206A is positioned at the first bearing 214A and is sensitive to strain and/or temperature of the first bearing. The second circumferential FBG sensor 206B is positioned at the second bearing 214B and is sensitive to strain and/or temperature of the second bearing 214B. In the particular example shown in FIG. 2, each of the radial FBG sensors 206A, 206B is mounted around the axle 212, between the axle 212 and the inner race 218A, 218B of the respective bearing 214A, 214B. In another example, each of the radial FBG sensors 206A, 206B may be mounted around the outer race 216A, 216B of the respective bearing 214A, 214B, or around the inside or outside of the axle 212. The outer race 216A, 216B, the inner race 218A, 218B and/or the axle 212 may comprise a groove into which each of the FBG sensors 206A, 206B is seated. In the example shown in FIG. 2, each of the radial FBG sensors 206A, 206B comprises a single loop. Alternatively, each of the FBG sensors 206A, 206B may comprise multiple loops.

The axial and radial FBG sensors each comprise an optical fibre comprising a plurality of FBG elements 204. The FBG elements 204 are etched directly into the core of the optical fibre. The spacing, between each immediately-adjacent pair of the FBG elements 204, may be equal. Alternatively, the spacing between a first immediately-adjacent pair of the FBG elements 204 may differ from the spacing between a second immediately-adjacent pair of the FBG elements 204. In other embodiments, there may be unequal spacing between each of the FBG elements 204 along the fibre.

The FBG sensors 202A, 202B, 202C, 202D, 206A, 206B sense strain and/or temperature of the first and second bearing 214A, 214B. Each of the axial FBG sensors is sensitive to changes in strain and/or temperature of both the first bearing 214A and the second bearing 214B. By contrast, the first radial FBG sensor 206A is sensitive to change in strain and/or temperature of the first bearing 214A only, and the second radial FBG sensor 206B is sensitive to changes in strain and/or temperature of the second bearing 214B only. The strain and/or temperature of the bearings 214A, 214B are determined by analysing optical characteristics of the FBG elements 204 of the axial FBG sensors 202A, 202B, 202C, 202D, and the radial FBG sensors 206A, 206B.

When a mechanical force is applied to one of the FBG elements 204 of the FBG sensors 202A, 202B, 202C, 202D, 206A, 206B, the optical characteristic of the FBG element 204 changes. In particular, when the mechanical force is applied, the spacing of the grating of the FBG element 204 changes. Therefore, the emission wavelength of the FBG element 204 changes. For example, if a compression is applied to the FBG element 204, the spacing of the grating is reduced, engendering a blue shift in wavelength. In contrast, if a tension is applied to the FBG element 204, the spacing of the grating is increased, engendering a red shift in wavelength.

The assembly 200 is part of a system comprising one or more light sources and an interrogator 220. The one or more light sources are configured to direct light towards the FBG sensors 202A, 202B, 202C, 202D, 206A, 206B. The interrogator is configured to receive the optical signals output from the FBG sensors 202A, 202B, 202C, 202D, 206A, 206B, and determine a strain and/or or temperature of the bearings 214A, 214B based on the received optical signals. The optical characteristics of the FBG elements 204 of each of the FBG sensors may be represented as optical spectra. The optical characteristics may represent a pattern or spacing of the grating of the FBG elements 204. In use, the FBG sensors receive light from the one or more light sources emitting a wavelength full optical spectrum. Considering, for example, the FBG sensor 202A, the light passes through the optical fibre of the FBG sensor 202A and reaches a first FBG element 204 of the plurality of FBG elements 204 of the FBG sensor 202A. A characteristic of the light is modified by the first FBG element 204 of the FBG sensor 202A and a first optical spectrum is obtained. The characteristic of the light may be, for example, a spectrum of wavelengths. Similarly, the light with the full wavelength spectrum of emitted by the one or more light sources reaches a second FBG element 204 of the plurality of FBG element 204 of the FBG sensor 202A. The characteristic of the light is modified by the second FBG element 204 and a second optical spectrum is obtained, and so on. An optical spectrum is obtained for each FBG element 204 of the plurality of FBG elements 204 of the FBG sensor 202A. The optical signal output by the FBG sensor 202A may therefore be said to comprise a plurality of optical spectra, each spectrum generated by a respective FBG element 204 of the sensor 202A. The interrogator 220 then analyses the optical signal from the FBG sensor 202A to determine the strain and/or the temperature of the FBG sensor 202A. The same analysis can be performed for each FBG sensor 202A, 202B, 202C, 202D, 206A, 206B.

As explained above, the assembly 200 comprises the interrogator 220 configured to receive optical signals from each FBG sensor 202A, 202B, 202C, 202D, 206A, 206B. The interrogator 220 is configured to analyse the optical signals output by the FBG sensors to determine a strain and/or temperature of the first bearing 214A and the second bearing 214B.

Broadly speaking, the interrogator 220 comprises at least one light measurer, and the interrogator 220 is configured to determine a strain and/or temperature of the bearings 214A, 214B based on the optical signals received at the light measurer from the FBG sensors 202A, 202B, 202C, 202D, 206A, 206B. The or each light measurer may be, for example, a wavelength meter, a photodetector, or a photodiode, such as an avalanche photodiode or a PIN diode.

For example, the interrogator 220 may comprise a primary optical splitter, a plurality of secondary optical splitters, one or more light sources, a processor, a plurality of light measurers, and an analogue to digital converter. The processor is communicatively connected to the light measurers.

The one or more light sources are configured to direct light towards the FBG sensors 202A, 202B, 202C, 202D, 206A, 206B. The one or more light sources may be tuneable lasers. In another example, the one or more light sources may be broadband light sources or broadband light sources with tuneable a narrowband filter on the output.

Considering for example the two FBG sensors 202A and 202B, the one or more light sources may be arranged to output light into the primary optical splitter. The primary optical splitter splits the light received from the one or more light sources into two portions, and these two portions are fed into the first and second secondary optical splitters, respectively. From the first secondary optical splitter, the portion of light received from the primary optical splitter is sent through the first FBG sensor 202A. From the second secondary optical splitter, the portion of light received from the primary optical splitter is sent through the second FBG sensor 202B. The reflected light from the FBG sensor 202A passes back through the first secondary optical splitter to the first light measurer, and the reflected light from the FBG sensor 202B passes back through the second secondary optical splitter to the second light measurer.

In embodiments in which the one or more light sources are broadband light sources, the, or each of the, light measurer(s) may be a wavelength meter configured to measure the wavelength of the light reflected from the FBG elements 204 of the respective sensors. The processor processes the wavelength(s) measured by light measurers, and converts the measured wavelengths (for example via a calibration) into a mechanical force or thermal energy applied to the sensors.

In embodiments in which the one or more light sources are tuneable narrow band optical sources, such as a tuneable laser as in the present embodiment, the, or each of the, light measurer(s) may be a photodetector or a photodiode such as an avalanche photodiode or a PIN diode configured to measure the intensity of light reflected from the FBG elements 204 of the respective sensors. The analogue to digital converter is arranged to convert the analogue photodiode signals into digital signals, which are then provided to the processor. In this example, the processor is arranged to control the tuneable laser to emit light successively at different wavelengths, and at the same time monitor light intensity signals received from the photodiodes. The processor can thus determine for which emitted wavelength the highest intensity of reflected light is detected, and thereby determine the wavelength of light most reflected by the FBG elements 204 of the sensors at that point in time. The processor may then convert the determined wavelengths (for example via a calibration) into a mechanical force or thermal energy applied to the sensors.

It will be appreciated that although two secondary optical splitters and two associated light measurers are described in the examples above, in other examples there may be any number of optical splitters and associated light measurers. For example, there may be one pair of secondary optical splitters and an associated light measurer for each FBG sensor. In some examples, as noted above, there may be only one light measurer and associated secondary optical splitter for all FBG sensors.

In an example, the assembly 200 may comprise two or more light sources, each emitting at a different wavelength. As noted above, the range of wavelengths reflected by one of the FBG elements 204 of an FBG sensor may be different from the range of wavelengths reflected by another FBG element 204 of the FBG sensor. Therefore, a first FBG element 204 may be transparent to a range of wavelengths needed to interrogate a second FBG element 204, and the first and second FBG elements 204 may be transparent to a range of wavelengths needed to interrogate a third FBG element 204, and so on. Therefore, by using two or more light sources, each emitting at a different wavelength reduces the weight and complexity of connections needed to interrogate each FBG sensor.

As indicated above, the interrogator 220 receives optical signals from the FBG sensors 202A, 202B, 202C, 202D, 206A, 206B to determine strain and/or temperature of the first bearing 214A and the second bearing 214B. As will now be described, the determined strains and/or temperatures of the bearings 214A, 214B may be used to determine, for example, shear and/or lateral forces acting on the wheel, mass imbalance of the wheel, or the condition of the bearings.

In this embodiment, the FBG sensor 202A and the FBG sensor 202B are used to determine vertical forces, such as a ground force applied to the wheel 208 or a vertical force depending on the aircraft weight. Each of the FBG sensor 202A and the FBG sensor 202B may alone be used to determine such forces. However, when a vertical force is applied to the FBG sensor 202A and the FBG sensor 202B, the force has a different impact on each FBG sensor 202A, 202B. In particular, in response to a vertical force, one of the FBG sensors 202A, 202B will be in compression and the other will be in tension. As a result, the optical signals output by the FBG sensors 202A, 202B will be different. For example, when one of the FBG sensors 202A is in tension, the spectra of the optical signal output by the FBG sensor 202A may be shifted to higher wavelengths. By contrast, when the other of the FBG sensors 202B is in compression, the spectrums of the optical signal output by the FBG sensor 202B may be shifted to lower wavelengths. Accordingly, by analysing the optical signals of the two FBG sensors 202A, 202B, the interrogator 220 is capable of sensing the direction and magnitude of vertical forces. For example, when an upward vertical force is applied to the wheel 208 and axle 212 (e.g. ground force), the upper FBG sensor 202A will be in tension, and the lower FBG sensor will be in compression.

Conversely, when a downward vertical force is applied to the wheel 208 and axle 212 (e.g. weight of the suspended wheel in flight), the upper FBG sensor 202A will be in compression, and the lower FBG sensor will be in compression. The FBG sensors 202A, 202B may therefore be used to sense the weight of the aircraft. The sensed weight of the aircraft may be used in a high integrity system and automatically entered into a flight computer, or the sensed weight may be compared to an aircraft weighted entered by a pilot. The FBG sensors 202A, 202B may also be used to detect landing forces and identify if a hard landing may have occurred. For example, a peak detection algorithm may be used to determine an impact by analysing significant shift in the spectrums of the optical signals output by the FBG sensors 202A, 202B.

When the vertical force acting on the wheel 208 and axle 212 is uniform and balanced, the FBG elements 204 of the upper FBG sensor 202A experience the same strain, and the FBG elements 204 of the lower FBG sensor 202B experiences the same strain. However, the FBG sensors 202A, 202B may also be used to determine unbalanced forces, such as shear forces or localised forces acting on the wheel 208 and axle 212. For example, in response to a vertical shear force or vertical moment acting on the axle, the FBG elements 204 of the FBG sensors 202A, 202B may experience different strains. As a result, the optical signals output of the FBG sensors 202A, 202B may be used to sense the location of the vertical forces as well as the magnitude and direction. The FBG sensors 202A, 202B may therefore be used to sense wheel mass imbalance, runway irregularity or vibrations indicative of wear to the bearings.

In this embodiment, the FBG sensor 202C and the FBG sensor 202D are used to determine horizontal forces such as a drag force caused by wheel drag or a deceleration force caused by the brakes. Each of the FBG sensor 202C and the FBG sensor 202D may alone be used to determine such forces. However, when a horizontal force is applied to the FBG sensor 202C and the FBG sensor 202D, the force has a different impact on each FBG sensor 202C, 202D. Similar to that described above for the vertical FBG sensors 202A, 202B, in response to a horizontal force, one of the FBG sensors 202C, 202D will be in compression and the other will be in tension. As a result, the optical signals output by the FBG sensors 202C, 202D will be different. For example, when one of the FBG sensors 202C is in tension, the spectra of the optical signal output by the FBG sensor 202C may be shifted to higher wavelengths. By contrast, when the other of the FBG sensors 202D is in compression, the spectra of the optical signal output by the FBG sensor 202D may be shifted to lower wavelengths. Accordingly, by analysing the optical signals of the two FBG sensors 202C, 202D, the interrogator 220 is capable of sensing the direction and magnitude of horizontal forces. For example, when a horizontal force acts on the wheel 208 and axle 212 in a rearward direction (e.g. drag force during acceleration), the front FBG sensor 202C will be in compression, and the rear FBG sensor 202D will be in tension. Conversely, when a horizontal force acts on the wheel 208 and axle 212 in a forward direction (e.g. brake force during deceleration), the front FBG sensor 202C will be in tension, and the rear FBG sensor 202D will be in compression. The FBG sensors 202C, 202D may be used to determine, for example, a braking force on the wheel 208. Further, the impact of the brake force may be analysed to determine or predict a brake condition. Similarly, the drag force may be analysed to determine or predict a wheel condition.

Additionally, as noted above in connection with the vertical FBG sensors 202A, 202B, the horizontal FBG sensors 202C, 202D may be used to sense shear forces or localised forces acting on the wheel 208 and axle 212. Such forces can be used to measure dynamic behaviours such as bearing condition, wheel imbalance, shimmy or runway irregularity.

The radial FBG sensors 206A, 206B are capable of sensing radial forces acting on the bearings. The radial FBG sensors 206A, 206B are therefore capable of sensing both vertical forces and horizontal forces, as well as radial forces acting in other directions. Depending on the directions of the applied forces, some FBG elements 204 of each radial FBG sensor 206A, 206B will be in compression and other FBG elements 204 will be in tension. For example, when an upward vertical force is applied to the wheel 208 (e.g. ground impact on landing), the FBG elements 204 at the bottom of the FBG sensors 206A, 206B will be in compression and the FBG elements at the top of the FBG sensors 206A, 206B will be in tension. Similarly, when a horizontal force acts on the wheel 208 in a forward direction (e.g. brake force during deceleration), the FBG elements 204 at the front of the FBG sensor 206A, 206B will be in tension and the FBG elements 204 at the rear of the FBG sensor 206A, 206B will be in compression. Each of the radial FBG sensors 206A, 206B may be used to determine both horizontal and vertical forces, as well as other radial forces. Moreover, by comparing the optical signals of both the first radial FBG sensor 206A and the second radial FBG sensor 206B, it is possible to determine, for example, unbalanced forces such as shear, or lateral forces acting on the wheel, as well as wheel asymmetry or wheel mass imbalance. For example, when a vertical shear force is applied to the wheel 208, one bearing will experience a strain than differs in magnitude to that of the other bearing. As a result, one radial FBG sensor will experience a strain that differs from that of the other radial FBG sensor. More particularly, the FBG elements at the top of the radial FBG sensor experiencing a downward force will be in compression, and the FBG elements at the bottom of the FBG sensor will be in tension. In contrast, the FBG elements at the top of the other radial FBG sensor, experiencing an upward force, will be in tension, and the FBG elements at the bottom will be in compression. In another example, a lateral force may be applied to the wheel 208. As a result, the loading or preload of each of the bearings may differ. In particular, the loading or preload of one bearing may increase, and the loading or preload of the other bearing may decrease. Which of the two bearing experiences increased loading or preload will then depend on the direction of the lateral force. Changes in the loading or preloading of the bearings 214A, 214B may in turn translate to differences in strain on each of the radial FBG sensors 206A, 206B. For example, the FBG elements 104 of the radial FBG sensor around the bearing having a higher loading or preload may experience a higher strain.

As explained above, the axial FBG sensors 202A, 202B, 202C, 202D, and/or the radial FBG sensors 206A, 206B may be used to determine the temperature of the first bearing 214A and the second bearing 214B. For example, changes in the temperature of the first bearing 214A may cause the refractive index of the FBG elements 204 of the first circumferential FBG sensor 206A to change, which in turn causes the spectra of the optical signal to change. Likewise, changes in the temperature of the second bearing 214B may cause the refractive index of the FBG elements 204 of the second radial FBG sensor 206B to change, which in turn causes the spectra of the optical signal to change. Differences in the temperatures of the two bearings 214A, 214B, as sensed by the FBG sensors 206A, 206B, may suggest a loss of lubricant or wear of one or more of the bearings 214A, 214B. Therefore, the temperature may be used to determine or predict a bearing condition, or as preventative maintenance in order to extend the operational lifetime of the bearings 214A, 214B.

By comparing the optical signals of the axial FBG sensors 202A, 202B, 202C, 202D, and/or the radial FBG sensors 206A, 206B and determining differences between the emission spectra of the optical signals, it is possible to determine the strain caused by different mechanical forces acting on the bearings 214A, 214B, as well possible temperature changes in the bearings 214A, 214B. By employing a combination of axial and radial sensors, changes in the emission spectra due to changes in strain, temperature or both may be better resolved. For example, changes in the emission spectra of one of the radial sensors may arise due to changes in strain or temperature of the respective bearing. However, by additionally providing one or more axial sensors, and by comparing the emission spectra of the axial and radial sensors, a better determination may be made as to whether the changes observed in the emission spectra of the radial sensor are due to strain, temperature or both.

In an example, the radial FBG sensor 206A, 206B may be used to determine the rotational speed of the wheel 208. When the wheel 208 is rotating, each FBG element 204 of a radial FBG sensor 206A, 206B, experiences increased strain as each bearing roller 210 passes the FBG element 204. The interrogator 220 is then able to sense this periodic increase and decrease in strain and from this determine the speed of the bearing 214A, 214B and thus the speed of the wheel 208. The assembly 200 may therefore be used as a tachometer to obtain the ground speed of the aircraft.

Figure 3:
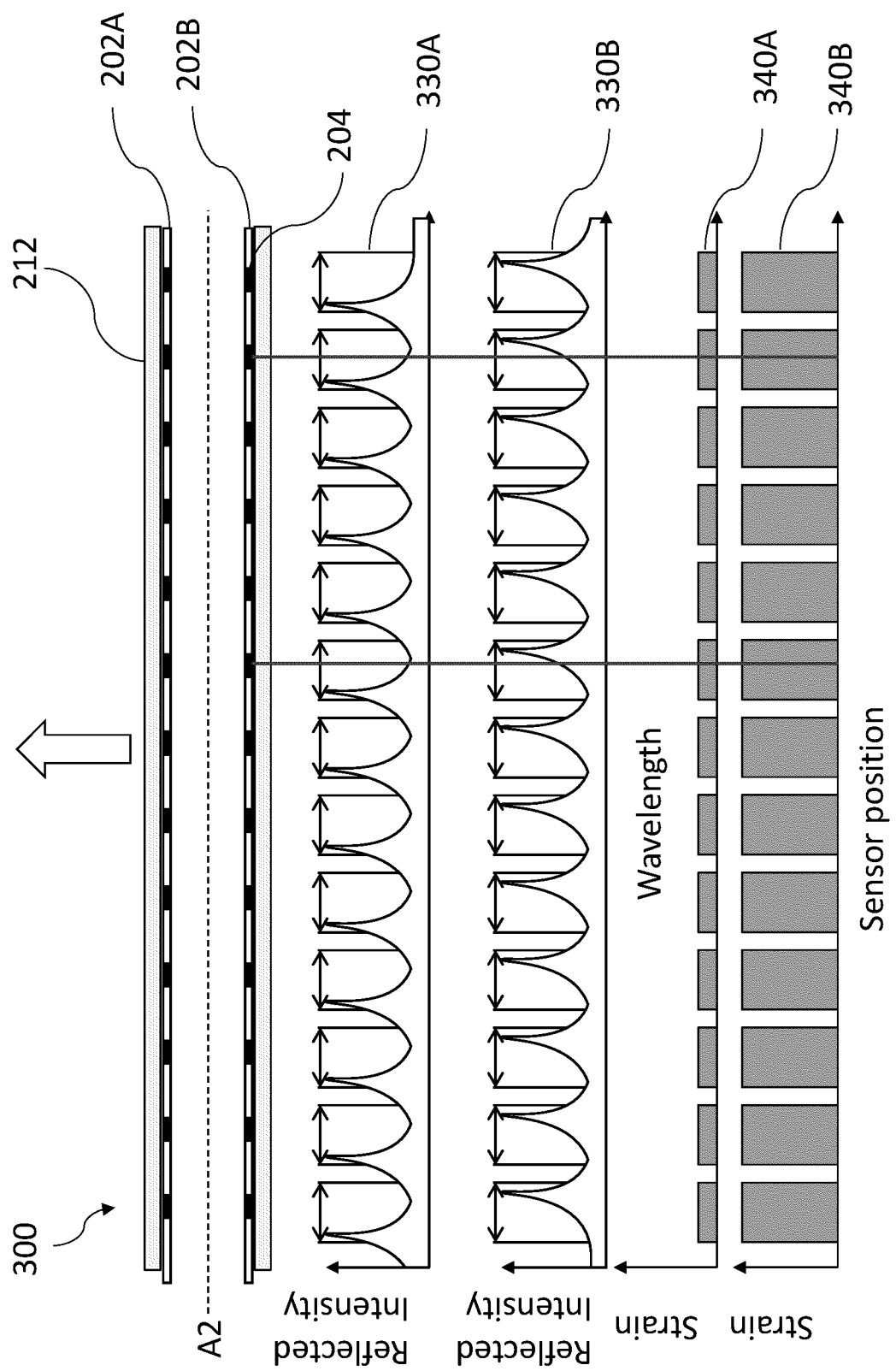
FIG. 3 shows a schematic view of the functioning of the assembly of FIG. 2.

FIG. 3 shows a schematic of the functioning of the assembly 200 according to an example. In particular, this example illustrates the functioning of the FBG sensor 202A and the FBG sensor 202B of FIG. 2. In this example, the FBG sensors 202A, 202B experience an upward vertical force which may be a ground force applied to the wheel (e.g. due to ground impact on landing).

As explained above, one or more light sources direct light towards the FBG sensors 202A, 202B. Each FBG sensor 202A, 202B emits an optical signal which is transmitted to the interrogator 220. A first optical spectra 330A is obtained for the FBG elements 204 of the FBG sensor 202A, and a second optical spectra 330B is obtained for the FBG elements 204 of the FBG sensor 202B. Each spectrum shows a peak representing the optical spectrum output by each of the FBG elements 204. Before use, the emission of each FBG element 204 is calibrated in order to determine the emission "at rest", that is the emission when no force is applied to the FBG element 204. As explained above, the emission of the FBG elements 204 changes when a force is applied. In other words, a shift in wavelength is obtained when the spacing of the grating of the FBG elements 204 is changed. By comparing the emission of the FBG elements 204 with the emission "at rest" of the FBG elements 204, it is possible to determine if the emission has shifted and therefore if a force is being applied.

The interrogator compares each peak to the corresponding peak "at rest". Each peak of the FBG elements 204 of the FBG sensor 202A indicates a same shift in wavelength, indicating that the FBG sensor 202A experiences a balanced force. Similarly, each peak of the FBG elements 204 of the FBG sensor 202A indicates a same shift in wavelength. However, the shift in wavelength of the FBG elements 204 of the FBG sensor 202A is different from the shift in wavelength of the FBG elements 204 of the FBG sensor 202B. Specifically, the optical signal output by the FBG sensor 202A is shifted to lower wavelengths, and the optical signal output by the FBG sensor 202B is shifted to higher wavelengths. The interrogator 220 analyses the spectra of the FBG sensors 202A, 202B in order to obtain band spectra 340A, 340B representing each peak (i.e. each FBG element 204). The exact wavelength of each peak is computed in order to represent the strain at that FBG element 204. The magnitude of each band represents the strength of the strain. The peaks of the band spectra 340B of the FBG sensor 202B are at a higher wavelength than the peaks of the band spectra 340A of the FBG sensor 202A, which indicates that the FBG sensor 202A is in tension whereas the FBG sensor 202B is in compression.

In the example illustrated in FIG. 3 above, each of the FBG elements 204 of each FBG sensor 202A, 202B experiences the same strain. In another example, the FBG elements of each FBG sensor may experience different strains. As a result, the optical signals output by each FBG sensor 202A, 202B will indicate different shifts in wavelength (one of the sensors being in tension and the other one being in compression). This would be caused by shear forces and would indicate, for example, wheel imbalance or runway irregularity which would cause sear forces.

Figure 4:
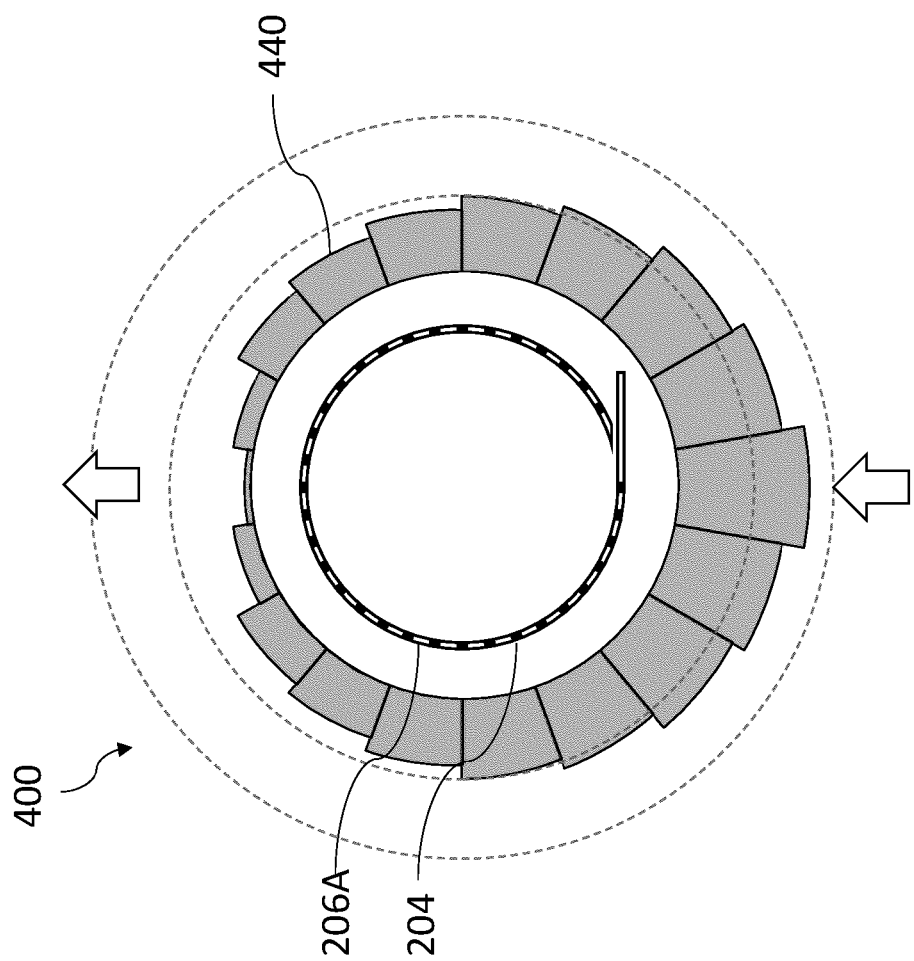
FIG. 4 shows a schematic view of the functioning of an assembly of the assembly of FIG. 2.

FIG. 4 shows a schematic of the functioning of the assembly 200 according to an example. In particular, this example illustrates the functioning of the first radial FBG sensor 206A of FIG. 2.

In this example, the radial FBG sensor 206A experiences an upward vertical force which may be a ground force applied to the wheel (e.g. due to ground impact on landing). As explained above, one or more light sources direct light towards the circumferential FBG sensors 206A. Each FBG element 204 of the sensor emits an optical spectrum which is transmitted to the interrogator 220 and analysed to determine the strain experienced by each FBG element 204. FIG. 4 shows the time-average strain experienced by the FBG sensor 206A when the bearing experiences the upward vertical force. The FBG elements 204 at the bottom of the FBG sensor 206A are in compression. In contrast, the FBG elements 204 at the top of the FBG sensor 206A are in tension.

As described above, as a bearing roller passes by an FBG element 204, the FBG element 204 experiences an increase in strain. FIG. 4 shows a time average of the strain. However, in reality, because the bearing is rotating, the strain experienced by each FBG element would oscillates at a frequency that depends on the speed of the bearing (from a maximum value when FBG element 204 is in contact with the bearing roller to a minimum value when the FBG element 204 is not in contact with the bearing roller). By measuring the frequency of oscillation, it is possible to determine the speed of the bearing.

Figure 5:
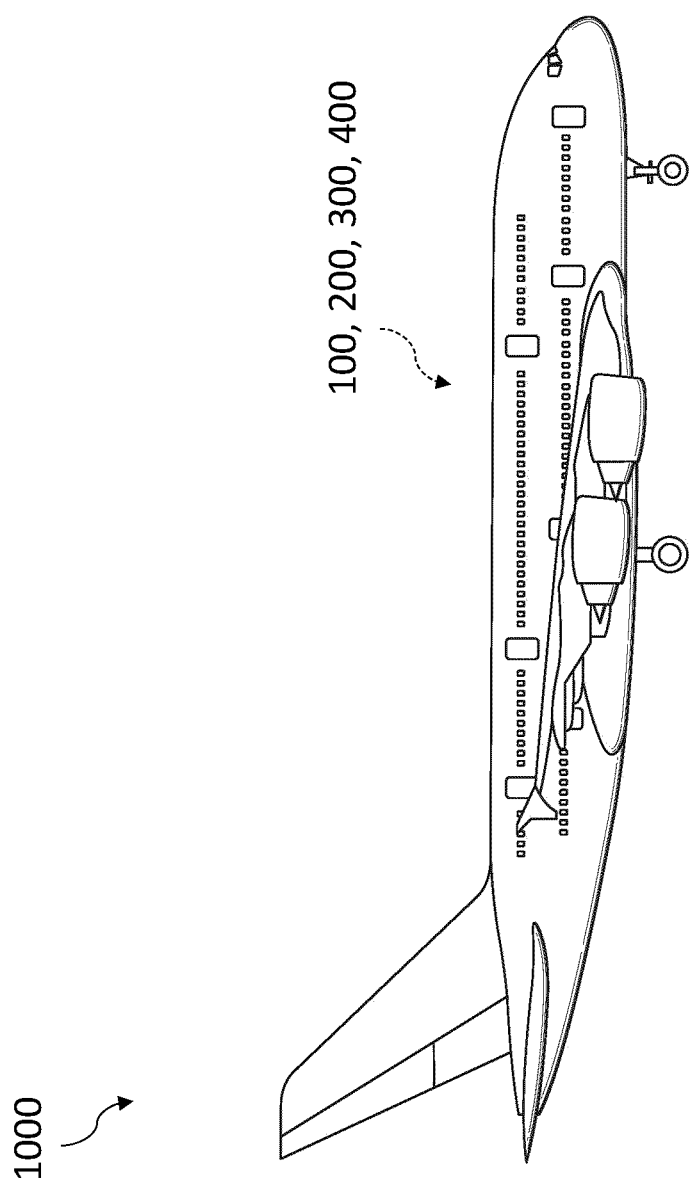
FIG. 5 is a view of an aircraft including an assembly according to an example.

Referring to FIG. 5, there is shown a schematic side view of an example of an aircraft, according to an embodiment of the invention. The aircraft 1000 may comprise any of the assemblies 100, 200 described herein.

The aircraft may also comprise other assemblies comprising any number of FBG sensors. Specifically, although the previous examples were described with five or six FBG sensors, it is possible to use any number of FBG sensors. Each FBG sensor described above may be used individually. For example, each individual FBG sensor may be used to determine a vertical force or a horizontal force, such as such as ground force applied to a wheel, a vertical force depending on the aircraft weight, a drag force caused by wheel drag, a deceleration force cause by brakes. Each individual FBG sensor may also be used to determine a temperature. Having multiple FBG sensors enables forces having different directions to be detected, as well as shear or unbalanced forces. Having multiple FBG sensors also increases the accuracy of the strain and/or temperature determination. Additionally, as explained above, having an FBG sensor mounted around each bearing of a wheel enables determining an asymmetry in the wheel. Similarly, by having an FBG sensor mounted around each bearing of both wheels of the aircraft, it is possible to determine more precisely any asymmetry in the aircraft load. Additionally, having an FBG sensor mounted around each bearing of a wheel arranged to form multiple loops may also increase the accuracy.

The aircraft may also comprise other assemblies comprising any number of FBG sensors that extend in a direction parallel to the axis of rotation of the bearing. Specifically, although the previously described examples comprise pairs of axial sensors that lie in vertical and horizontal planes, the direction and magnitude of applied forces may be determined using an alternative number and/or arrangement of axial sensors. For example, the direction and magnitude of applied forces may be determined using three axial sensors spaced evenly around the axle. In another example, a large number of axial sensors may be employed around the axle to increase the resolution with which the direction and magnitude of the forces may be determined.

The aircraft may comprise an assembly comprising one or more axial sensors that extend helically about the axle. A single helical axial sensor may, for example, be used to provide the same functionality (i.e. determination of strain and/or temperature) as that of multiple, linear axial sensors, by virtue of having FBG elements distributed around the inner circumference of the axle.

With the assemblies described above, the FBG sensors may be used to determine one or more of: weight on wheel, geometric weight imbalance, shimmy, loss of bearing lubricant, braking force measurement, wheel pre-stressing and post-stressing, peak load detection for hard landing detection, braking temperature, cantilever forces, bending forces and local strain.

The embodiments of the present invention have been described with FBG elements. In other examples, other fibre-based sensors may be used and the FBG elements may be replaced with other optical elements, such as a distributed sensor (for example, operating according to the principles of Rayleigh, Brillouin or Raman scattering), a long period grating senor or a tilted grating sensor.

The assemblies and systems described herein present inherent immunity to electromagnetic interference (EMI) or ground reference, and may be suitable for use in harsh environments. Other advantages include high sensing accuracy at least due to the lack of EMI noise, simplified routing of signal transmissions, removal of the need for lightning protection circuits since the assemblies can be non-electrically-conductive, limited failure modes due to the passive nature of the sensors, and weight-saving as compared to electrical systems since optical fibres and lighter than e.g. copper wires.

While some embodiments of the present invention have been described in the context of use within an aircraft, it should be appreciated that the invention has utility in other applications, including in vehicles other than aircraft, such as spacecraft, automobiles, railway vehicles, and watercraft, in machines, such as robots, machines for assembly, and machines for manufacture, such as machine tools, drills, as well as in structures with motors or pumps.

Additionally, the embodiments of the present invention may be used for testing or maintenance checks, for example, a wheel supported on an axle by a first bearing and a second bearing, a first fibre optic sensor extending around the first bearing for sensing a strain or temperature of the first bearing, and a second fibre optic sensor extending around the second bearing for sensing a strain or temperature of the second bearing, such as the wheel described with reference to FIG. 2, may be part of a system which does not include an interrogator. A separate interrogator may be used when testing the system or during maintenance checks.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. An aircraft system, comprising:
 a wheel supported on an axle by a first bearing and a second bearing;
 a first fibre optic sensor provided at the first bearing for sensing a strain or temperature of the first bearing;
 a second fibre optic sensor provided at the second bearing for sensing a strain or temperature of the second bearing; and
 an interrogator configured to receive optical signals from the sensors, and analyse the optical signals to determine differences in the strains or temperatures of the first bearing and the second bearing.

2. An aircraft system according to claim 1, wherein each of the sensors is provided around a race of a respective bearing.

3. An aircraft system according to claim 1, wherein the first sensor and the second sensor each extend about a rotational axis of the wheel, and the aircraft system comprises a third fibre optic sensor that extends in a direction parallel to the rotational axis.

4. An aircraft system according to claim 3, further comprising a fourth fibre optic sensor that extends in a direction parallel to the rotational axis, and the third sensor, the fourth sensor and the rotational axis lie in a common plane.

5. An aircraft system according to claim 4, wherein, when the rotational axis extends horizontally, the common plane extends horizontally or vertically.

6. An aircraft system according to claim 3, wherein the third sensor extends along an inside of the axle.

7. An aircraft system according to claim 1, wherein the first sensor extends around the first bearing, the second sensor extends around the second bearing, and the aircraft system comprises a third fibre optic sensor that extends through the first bearing and the second bearing.

8. An aircraft system according to claim 1, wherein each of the sensors is a fibre Bragg grating sensor.

9. An aircraft system according to claim 1, wherein the aircraft system uses the differences in the strains or temperatures to determine at least one of: a condition of the bearings, mass imbalance of the wheel, shear forces acting on the wheel, and lateral forces acting on the wheel.

10. An aircraft comprising the system or assembly according to claim 1.

11. An aircraft wheel assembly comprising a wheel supported on an axle by a first bearing and a second bearing, a first fibre optic sensor extending around the first bearing for sensing a strain or temperature of the first bearing, and a second fibre optic sensor extending around the second bearing for sensing a strain or temperature of the second bearing.

12. An aircraft wheel assembly according to claim 11, wherein the aircraft wheel assembly comprises one or more third fibre optic sensors that extend through the first bearing and the second bearing.

13. A sensor arrangement for an aircraft comprising a wheel supported by a first bearing and a second bearing, comprising:
- a first fibre Bragg grating sensor for sensing a strain or temperature of the first bearing;
- a second fibre Bragg grating sensor for sensing a strain or temperature of the second bearing; and
- an interrogator for receiving optical signals from the sensors, and for analysing the optical signals to determine differences in the strains or temperatures of the first bearing and the second bearing.

* * * * *